United States Patent [19]

Fuderer

[11] 4,381,189

[45] Apr. 26, 1983

[54] PRESSURE SWING ADSORPTION PROCESS AND SYSTEM

[75] Inventor: Andrija Fuderer, Antwerp, Belgium

[73] Assignee: Union Carbide Corporation, Danbury, Conn.

[21] Appl. No.: 315,418

[22] Filed: Oct. 27, 1981

[51] Int. Cl.³ .............................................. B01D 53/04
[52] U.S. Cl. .......................................... 55/26; 55/62; 55/75; 55/179; 55/389
[58] Field of Search .................... 55/25, 26, 58, 62, 68, 55/74, 75, 179, 387, 389

[56] References Cited

U.S. PATENT DOCUMENTS

| | | | |
|---|---|---|---|
| 3,085,379 | 4/1963 | Kiyonaga et al. | 55/62 X |
| 3,430,418 | 3/1969 | Wagner | 55/25 |
| 3,788,036 | 1/1974 | Lee et al. | 55/25 |
| 3,977,845 | 8/1976 | Walter | 55/25 |
| 3,986,849 | 10/1976 | Fuderer et al. | 55/68 X |
| 4,171,206 | 10/1979 | Sircar | 55/62 X |
| 4,194,890 | 3/1980 | McCombs et al. | 55/25 X |
| 4,259,091 | 3/1981 | Benkmann | 55/25 |
| 4,340,398 | 7/1982 | Doshi et al. | 55/25 |

Primary Examiner—Robert H. Spitzer
Attorney, Agent, or Firm—Alvin H. Fritschler

[57] ABSTRACT

Bed utilization and product recovery are enhanced in pressure swing adsorption operations, especially for high pressure applications, by terminating cocurrent depressurization at a relatively high intermediate pressure level. Additional void space gas is released from each main adsorption bed by partial countercurrent depressurization prior to conventional countercurrent blowdown. Such additional gas is passed to a satellite bed adapted for simultaneous release of gas from its discharge end, thereby cocurrently depressurizing said satellite bed from said intermediate pressure level, with the thus-released gas being passed to the discharge end of another satellite bed or beds and/or another main bed or beds for pressure equalization and/or purging purposes. The satellite bed is one of a satellite group of adsorption beds containing a lesser number and smaller beds than in said main bed system, the satellite beds not being operated above said intermediate pressure level.

41 Claims, No Drawings

PRESSURE SWING ADSORPTION PROCESS AND SYSTEM

BACKGROUND OF THE INVENTION

1. Field of the Invention

The invention relates to the purification of gases in a pressure swing adsorption system. More particularly, it relates to enhancing the adsorption bed utilization in such a system, particularly in high pressure applications.

2. Description of the Prior Art

The pressure swing adsorption (PSA) process provides a highly desirable means for separating and purifying at least one gas component from a feed gas mixture of said gas component and at least one selectively adsorbable component. Adsorption occurs in an adsorbent bed at a higher adsorption pressure, with the selectively adsorbable component thereafter being desorbed by pressure reduction to a lower desorption pressure. The PSA process is commonly employed in multi-bed systems. The Wagner patent, U.S. Pat. No. 3,430,418, discloses a PSA process and system employing at least four adsorption beds arranged for carrying out the PSA processing sequence on a cyclic basis. This sequence includes higher pressure adsorption, cocurrent depressurization to intermediate pressure with release of void space gas from the product end of the bed, countercurrent depressurization or blowdown to a lower desorption pressure, and repressurization to the higher adsorption pressure. Wagner teaches the passing of the released void space gas from one bed directly to another bed initially at its lower desorption pressure. The pressure in the two beds is thereby equalized at an intermediate pressure, after which additional void space gas is released from the one bed as it is depressurized to a lower pressure. The other bed is further repressurized from the intermediate pressure to its higher adsorption pressure at least in part by the countercurrent addition of product effluent to the product end of the bed being repressurized.

In a further development of the art, the Fuderer patent, U.S. Pat. No. 3,986,849, discloses the use of at least seven adsorbent beds, with the feed gas mixture being introduced to the feed end of at least two adsorbent beds, in overlapping identical processing cycles, at all stages of the PSA processing sequence. It is known in the art that advantages can be achieved in particular embodiments by employing a second pressure equalization step in addition to that referred to above. By such a step, a bed undergoing repressurization is further pressure equalized with the void space gas from another bed to a higher intermediate pressure subsequent to the pressure equalization of the bed from its initial desorption pressure to an initial intermediate pressure. In accordance with the Fuderer teaching, each bed, in turn, undergoes three pressure equalization steps prior to final repressurization to the higher adsorption pressure. Fuderer also discloses the carrying out of the three pressure equalization steps in a particular manner to achieve higher product purity by substantially avoiding the impurity profile reversion that can occur upon pressure equalization between the beds, as discussed in the patent. It is also within the contemplation of the art to employ, in some circumstances, a fourth pressure equalization step prior to final repressurization with product effluent.

As noted above, cocurrent depressurization occurs with the flow of void space gas toward the discharge end of the adsorbent bed. During this very useful and important step, product gas is released from the bed at gradually decreasing pressure, and an adsorption front progresses in the bed toward the discharge, or product, end of the bed. The part of the bed in which the adsorption front moves from the start to the end of the cocurrent depressurization step is referred to as the "Front Advance Section" or "FAS." The bed section extending from the inlet, or feed, end of the bed to the stoichiometric point of the adsorption front at the end of the higher pressure adsorption step, in which a feed gas mixture is passed to the inlet end of the bed and product effluent is withdrawn from the discharge end thereof, is referred to as the "Equilibrium Section" or "ES." The FAS is thus a fraction of the total bed, and its size depends on various factors such as the initial and final pressure, molar concentration and bed loading of impurities, adsorbent characteristics and the like. When the concentration of adsorbable impurities in the feed gas is relatively low, e.g. about 5 mol%, and the drop from feed pressure to final cocurrent depressurization pressure is not too great, for example from about 20 bar to about 5 bar pressure, the FAS will be frequently less than 10% of the total bed size. When, on the otherhand, the impurity concentration in the feed is higher, e.g., 30 mol% and the final cocurrent depressurization pressure is lower, as where said pressure drops from about 20 bar to about 3 bar, the FAS may comprise more than 35% of the total bed. In general, it may be observed that the adsorption front advances very little when the bed is depressurized from feed pressure to one half or even to one third of the feed pressure. The adsorption front advances much more as the cocurrent depressurization is continued to lower pressures with the ratio of feed pressure to final cocurrent depressurization pressure increasingly exceeding about 3/1.

Those skilled in the art will appreciate that a large FAS results in several disadvantages affecting the overall PSA process. Thus, the adsorbent bed inventory and the adsorbent vessel size are necessarily higher than if a lower FAS could be employed, adding to the material and apparatus costs associated with the process. In addition, the bed void spaces in the FAS, at the end of the feed-adsorption-product removal step, are filled with product gas at the feed pressure. At a large FAS, the quantity or storage of product gas in the bed is, therefore, large. Furthermore, the product discharge end of the bed is not effectively utilized during the feed-adsorption-product removal step as the ES does not extend as far into the bed as it could if the FAS associated with the process were relatively small. The higher the feed gas mixture pressure employed, the more significantly these disadvantages are found to affect the overall process. High pressure PSA gas separations, e.g., at 20–70 bar feed gas pressures, are of commercial interest with respect to the purification of a variety of gases, such as those produced by (1) partial oxidation of residual oils, (2) coal gasification, e.g. coal hydrogenation recycle, and (3) methanol purge gas, hydrotreater and hydrocracker purge gas purifications and the like. Because of the large size of plants required for such commercial separations, as well of the high pressures generally involved, savings on the adsorbent vessel metal requirements and increased product recoveries are desirable to make such separations technically and economically feasible and attractive. Such desired savings, it will be appreciated, necessarily involve a reduction in the FAS of the adsorbent beds employed in the multi-bed, relatively high pressure PSA processing techniques and systems as known in the art.

It is an object of the invention, therefore, to provide a PSA process and system for reducing the FAS and enhancing the utilization of the adsorbent bed employed therein.

It is another object of the invention to provide a process and system for enhancing the recovery of product in PSA processing operations.

It is a further object of the invention to provide a PSA process and system capable of enabling reductions to be made in the metal requirements of the adsorbent beds used for PSA operations.

With these and other objects in mind, the invention is hereinafter described in detail, the novel features thereof being particularly pointed out in the appended claims.

SUMMARY OF THE INVENTION

The invention provides for the termination of conventional cocurrent depressurization at a high intermediate pressure level, and the incorporation of an additional, partial countercurrent depressurization step prior to countercurrent blowdown. The void space gas released during this partial countercurrent depressurization is passed to a satellite bed of smaller size than the main PSA system bed for cocurrent passage through said satellite bed from the inlet to the discharge end thereof, thereby cocurrently depressurizing the satellite bed during the partial countercurrent depressurization of the main bed. The gas released from the satellite bed is used for pressure equalization and/or purge purposes. Both the size and the number of satellite beds employed are less than that of the main PSA system employed in conjunction therewith. The conventional cocurrent depressurization of the main bed is terminated such that the ratio of the adsorption pressure/intermediate pressure is less than 5/1 to enhance the reduction of the FAS and thus the effective utilization and product recovery of each main bed in the PSA system.

DETAILED DESCRIPTION OF THE INVENTION

The terminating of the conventional cocurrent depressurization step at relatively high pressure, and the incorporation of a partial countercurrent depressurization step, in conjunction with the use of a satellite bed system as herein described and claimed, enables the FAS to be significantly reduced, enhancing bed utilization and product recovery as compared with conventional PSA technology. A very significant reduction is likewise achieved in the weight of steel needed in the main PSA system, further enhancing the desirability of the invention for use in practical commercial operations involving multi-bed systems, particularly in high pressure applications.

Tests have shown that the ratio of FAS/ES increases appreciably as the ratio of the feed or adsorption pressure to the intermediate pressure at which cocurrent depressurization is terminated increases. If no cocurrent depressurization step were employed, it will be understood that the FAS and the ratio FAS/ES would be zero. As will be seen from the prior art patents referred to above, however, cocurrent depressurization is considered to be a very useful and important step in the PSA processing cycle. When an adsorption bed is cocurrently depressurized to one half the adsorption pressure, it has been found that the FAS/ES is generally in the range of from about 0.1 to about 0.3. With further depressurization to much lower pressures, there is found to be a significant further front advance, and the FAS/ES can reach values between about 0.5 and 1.0. In PSA cycles employing seven or more beds and three pressure equalizations as in the Fuderer patent referred to above, it is common practice to cocurrently depressurize each bed to 1/7 or ⅛ of the feed adsorption pressure, resulting in a relatively large FAS.

If cocurrent depressurization were to be terminated at higher pressure levels, therefore, the FAS and the total adsorption bed size required could be reduced. In the Fuderer patent cycles, for example, it has been estimated that the total bed size could be reduced by on the order of 20–30% if the cocurrent depressurization step were to be stopped after the first or second cocurrent depressurization—pressure equalization step. This would be undesirable and is not done in conventional PSA processing, however, as it would necessarily result in the release of increased amounts of gas during countercurrent depressurization. This gas is used for fuel or other purposes, but reduces the amount of void space gas available for purge gas purposes and results in lower product gas recovery. This dilemma, surprisingly, can be favorably resolved so as to achieve more efficient bed utilization in addition to enhanced product recovery by the practice of the novel features of the invention as herein described and claimed.

The heart of the invention resides in the terminating of the cocurrent depressurization step at a relatively high pressure, i.e. with the ratio of adsorption pressure to intermediate pressure upon termination of said cocurrent depressurization being relatively low, and the employing of a partial countercurrent depressurization step prior to countercurrent depressurization or blowdown as employed in conventional practice. The void space gas released from the inlet end of each bed for such partial countercurrent depressurization is introduced to the inlet end of a satellite bed at about the intermediate pressure at which cocurrent depressurization is terminated. The satellite bed is one of a satellite group of adsorption beds, said group containing a lesser number and smaller beds than are employed in the conventional adsorption bed system with which the satellite group is associated. As used herein, the term "main bed" refers to each bed of the conventional PSA system being modified by the practice of the invention, and the term "satellite bed" refers to each of the smaller beds used in conjunction with said main bed system to achieve the advantageous balance of reduced FAS and improved bed utilization, together with enhanced product recovery and other advantages as noted below.

As released void space gas is introduced to the inlet end of each satellite bed, gas is released from the discharge end of said bed, commonly but not necessarily simultaneously, thereby cocurrently depressurizing the satellite bed while the main bed is being countercurrently depressurized in said partial countercurrent depressurization step of the invention. The gas thus released from the satellite bed is introduced to the discharge end of another main bed or beds and to another satellite bed or beds to pressure equalize and/or purge said beds as in conventional PSA operations. Gas is thereafter released from the inlet end of the satellite bed for countercurrent blowdown to desorption pressure. Thereafter, gas is introduced from another satellite bed to the discharge end of said satellite bed at desorption pressure for the purging thereof, with purge gas being discharged through the inlet end of the satellite bed being purged. This bed is thereafter repressurized from its desorption pressure to the intermediate pressure referred to above so that said satellite bed is placed in proper condition to receive additional quantities of void space gas released from the inlet end of a main bed during the partial countercurrent depressurization thereof as cyclic PSA operations are continued in the main adsorption bed—satellite group PSA system of the invention.

While it is generally desirable to terminate the cocurrent depressurization of a main bed at a relatively high level, it will be appreciated that the intermediate pressure level can approach the pressure level at which cocurrent depressurization would normally be terminated while still obtaining beneficial results from the practice of the invention. This will be particularly the case with respect to steam reformer gas streams or other streams for which the FAS/ES ratio does not rise as rapidly with increasing adsorption pressure/intermediate pressure ratios as is the case with ammonia purge gas and methanol purge gas streams, and the like. It is within the scope of the invention, therefore, to provide commercially available control means to terminate cocurrent depressurization at an intermediate pressure such that the ratio of adsorption pressure/intermediate pressure is less than about 5/1, although the intermediate pressure level may be allowed to reach even lower levels in some instances with particular feed gas mixtures to be treated and separated by such PSA processing. More preferably, the ratio will be less than about 3/1. If the ratio were to reach 1/1, this would represent the case where no cocurrent depressurization step would be employed, and the FAS and the FAS/ES ratio would be zero. For practical commercial embodiments, it is desirable for the FAS/ES to be at least in the range of from about 0.05 to about 0.1 or higher, up to about 0.3 or above, so that said adsorption pressure/intermediate pressure ratio will generally not fall below about 1.5/1.

The invention is particularly advantageous for use in PSA systems having from about 6 to about 10 main adsorption beds, although it may also be applied to systems having a number of beds falling outside this range, e.g., 4 or 5 bed systems or those having more than 10 beds. Similarly, the invention may be applied with respect to PSA systems operating at any desired feed gas pressure, i.e., adsorption pressure, although the invention has been found to be particularly useful with respect to practical applications in which the adsorption pressure is from about 30 to about 70 bar. The satellite beds will, of course, operate between the intermediate pressure refered to above and conventional countercurrent blowdown pressure, said satellite beds not being exposed to the higher feed gas pressure—adsorption pressure to which the main beds are exposed. As the satellite beds are used only to treat the void space gas released during the partial countercurrent depressurization step, it will be readily apparent that the size and number of such satellite beds will generally be smaller than for the main beds. For example with respect to a 7 main bed system, the difference between a conventional PSA system and the system of the invention can be illustrated in Table I as follows:

TABLE I

|  | No. of Beds | Volume, M³ One Bed | Total | Design Pressure, bar |
|---|---|---|---|---|
| Conventional PSA System | 7 | 40 | 280 | 46 |
| PSA System of Invention |  |  |  |  |
| Main Bed | 7 | 30 | 210 | 46 |
| Satellite Bed | 3 | 10 | 30 | 25 |

The system of the invention thus employs less adsorbent inventory and a smaller total bed volume than the conventional system. As the satellite bed system can be designed for lower pressure operation, the weight of steel required for the adsorption vessels can be reduced, actually by more than the indicated difference in adsorption volumes. This is especially important for relatively high feed pressures, such as the range of from about 30 to about 70 bar indicated above. Those skilled in the art will appreciate that the size and member of satellite beds employed in any particular application of the invention will depend on a variety of factors pertaining to the application, such as the number of main beds and the size thereof, the composition of the feed gas mixture to be separated, the particular adsorbent employed, the degree of purification desired, and the like. As the satellite beds are never pressurized to the feed gas—adsorption pressure level, the product recovery achievable in the practice of the invention will, however, generally be found to be higher than in the corresponding conventional PSA system to which the invention is applied.

The processing sequence for an illustrative embodiment comparing a conventional 7 bed PSA system with a 7 main bed—3 satellite bed PSA system of the invention is shown in Table II as follows:

TABLE II

CONVENTIONAL PSA SYSTEM:

```
1 |     A       |1 2   |3 |PP |D |P  |3 |2   |1 R   |
2 |1 R   |    A       |1 2   |3 |PP |D |P  |3 |2   |
3 |3 2   |1 R   |    A       |1 2   |3 |PP |D |P  |
4 |D |P  |3 2   |1 R   |    A       |1 2   |3 |PP |
5 |3 |PP |D |P  |3 2   |1 R   |    A       |1 2   |
6 |1 |2  |3 |PP |D P   |3 2   |1 R   |    A       |
7 |A       |1 2   |3 |PP |D'P   |3 2   |1 R  |  A  |
```

PSA SYSTEM OF THE INVENTION:

```
A 1 |     A       |1 2   |D |D   |   P   |3 |2   |1 R   |
A 2 |1 R   |    A       |1 2   |D |D   |   P   |3  2   |
A 3 |3 2   |1 R   |    A       |1 2   |D |D   |   P   |
A 4 |   P   |3 2   |1 R   |    A       |1 2   |D |D   |
A 5 |D |D   |   P   |3 2   |1 R   |    A       |1 2   |
A 6 |1  2   |D |D   |   P   |3 2   |1 R   |    A       |
A 7 |A       |1  2   |D |D   |   P   |3 2   |1 R  |  A  |
```

SATELLITE BED GROUP:

```
B 1 |3 |2   |3 |PP |D |P  |
B 2 |D |P  |3 |2   |3 |PP |
B 3 |3 |PP |D |P  |3 |2   |
``` wherein A represents high pressure adsorption, the numerals 1, 2 and 3 represent pressure equalizations at successively lower intermediate pressure levels, PP represents the providing of purge to another bed, D represents countercurrent blowdown to low pressure, R represents repressurization to high pressure, and D/D represents, with respect to the invention and the operation of the main beds in conjunction therewith, partial countercurrent depressurization with passage of gas to a satellite bed followed by conventional countercurrent blowdown.

In an illustrative example utilizing the Table II processing operations, it will be noted that, in the practice of the invention, cocurrent depressurization of the main beds is stopped after equalization 2. For example, bed A6 is depressurized from 31 to 19 bar, and it repressurizes both main bed A3 and satellite bed 31 from 10 to 19 bar. Because of the relatively high pressure as cocurrent depressurization of main bed A6 is stopped at an intermediate pressure of 19 bar, the FAS in said bed A6 is small, and its volume compared to the conventional system having a pressure of 6 bar at the end of the cocurrent depressurization step can be reduced 25%, e.g. from 40 m³ to 30 m³. Main bed A6 and satellite bed B1 are now both at the same pressure of 19 bar. By opening a valve in a transfer line connecting their feed ends, bed A6 can be caused to partially depressurize countercurrently, while the void space gas released from said bed A6 is introduced to the feed end of bed B1, with said bed B1 being cocurrently depressurized by the simultaneous release of gas from the discharge end of said satellite bed B1. The gas thus leaving bed B1 is introduced to the discharge end of both bed B2 and bed A4 from 1.3 to 9 bar. Bed A6 and bed B1 are both further depressurized to 4–5 bar, and the gas now exiting from bed B1 is used to purge bed B3 and bed A5. It should be noted that an external vessel is beneficial to store some of the purge gas. Both bed A6 and bed B1 are finally depressurized countercurrently to 1.3 bar, are purged at said 1.3 bar, and are repressurized by pressure equalizations. The maximum pressure to which the satellite group B is exposed is 19 bar. After main bed A6 has been repressurized to 31 bar, said bed A6 is further repressurized by product gas to 40 bar for adsorption at such high pressure. The characteristic pressure of the conventional system and of the system of the invention, for this illustrative example, are shown in Table III as follows:

TABLE III

|  | Pressure, bar | |
|---|---|---|
|  | Conventional | Invention |
| Feed-adsorption | 40 | 40 |
| First equalization | 32 | 31 |
| Second equalization | 22 | 19 |
| Third equalization | 12 | 10 |
| Provide purge | 6 | 4 |
| Purge | 1.3 | 1.3 |

The final repressurization of the 40 m³ main bed vessels from 32 to 40 bar requires more product gas than the repressurization of 30 m³ satellite bed vessels from 31 to 40 bar. Product recovery is, therefore, higher in the practice of the invention than is conventional PSA processing. This is confirmed also by the lower dump losses upon blowdown of the system of the invention compared with the conventional system. The improvement in product recovery and the savings on adsorber vessel costs tend to be higher, it will be appreciated, at relatively high feed pressures.

It will also be appreciated that various changes and modifications can be made in the various aspects of the process and system as herein disclosed and claimed without departing from the scope of the invention. Thus, while the gas released from the satellite bed during cocurrent depressurization thereof can be employed to pressure equalize and purge other satellite and main beds, as in the example above, said gas can be used for purging purposes only or for pressure equalization purposes only in particular embodiments of the invention. It should also be noted that, while the above examples was recited as showing the use of a purge step in the PSA cycle, it is possible to employ the PSA process of the invention without the inclusion of a low pressure purge step following countercurrent blowdown to low pressure. Those skilled in the art will likewise appreciate that the process and system of the invention can be employed with respect to any feed gas mixture, as in conventional PSA processing, from which it is possible to selectively adsorb at least one gas component in a multiple adsorption system as herein provided. In particular advantageous embodiments of the invention, hydrogen is the desired unadsorbed effluent removed from the discharge end of the main adsorption beds during the high pressure adsorption step, although other product gas or gases will be obtained in other embodiments of the invention.

The invention is of particular interest with respect to relatively large PSA systems with high feed gas pressures and high impurity concentrations. At feed pressures between about 30 and about 70 bar and with purge pressures of around atmospheric pressure, product gas recoveries of about 95% can be obtained either with a high number of pressure equalizations or by the compression of product gas obtained upon cocurrent depressurization after the last, for example, the third, pressure equalization. In both cases, however, the cocurrent depressurization is terminated at a very low pressure, e.g. 2–4 bar, which leads to a very undesirable increase in the FAS and the overall adsorption bed. The process and system of the invention, on the other hand, significantly reduces the size of the FAS and enables bed size to be reduced by 20–30%, while maintaining power costs at a low level and enhancing desired product recovery.

While the invention can be employed in a variety of multiple bed systems, conveniently those having from 4 to 10 main adsorbent beds, the invention is particularly useful in systems based on the above-identified Fuderer patent. In one embodiment of such systems of this invention, the main adsorption bed system has seven beds, includes two pressure equalizations by cocurrent depressurization of a main bed, and has a satellite bed system or group that includes two smaller satellite beds. In this system that was further described with reference to Table II above, gas released from the satellite beds cocurrently is employed for pressure equalization and purging in conjunction with the partial countercurrent depressurization of a main bed. In other embodiments, the main adsorption bed system has eight beds and employs two or three cocurrent depressurization, pressure equalizations, and the satellite system has two or three smaller satellite beds. In another embodiment, the main adsorption bed has ten beds and employs two cocurrent depressurization, pressure equalizations, and said satellite bed system has five beds, with gas released cocurrently therefrom being employed for two pressure equalizations and for purging. In such embodiments, at least two and sometimes three main beds are generally employed for high pressure adsorption at one time, as is described in the Fuderer patent. Those skilled in the art will appreciate that, in such 7 to 10 bed embodiments, the third pressure equalization step, as taught by Fuderer, is commonly performed using the cocurrently released gas from a satellite bed to pressure equalize with a main bed at lower pressure in phase of a third equalization using cocurrently released gas from a main bed.

As an example of a smaller bed system in which the invention can be effectively utilized, the main adsorption bed system may have four beds employing one pressure equalization by cocurrent depressurization. The satellite bed system, in this case, may have two beds, with gas released from each cocurrently, i.e., from the discharge end thereof, being used for purging. Said gas is released from the discharge end, as disclosed above, simultaneously with the passing of gas released countercurrently from the main bed to the feed end of said satellite bed. In other such embodiments, the main adsorption bed system may have from five to seven beds, and said satellite bed system may have two beds.

It is within the scope of the invention to compress blowdown gas to be used for fuel or other purposes and to employ gas released from the discharge end of a satellite bed, upon cocurrent depressurization thereof, for blowdown gas compression purposes, in addition to, or in place of, the pressure equalization and/or purging purposes of which said gas may be employed as disclosed above. Such blowdown compression can conveniently be achieved, for example, in particular PSA systems having eight or nine main adsorption beds. In illustrative examples of such embodiments, the main bed system conveniently may employ three pressure equalization steps in its processing cycle, and the satellite bed system may have three beds. Gas released from each satellite bed cocurrently is conveniently employed for compression of blowdown gas and for purging purposes. As in the other aspects of the invention, it will be appreciated that the gas being released from the discharge end of the satellite bed is so released in conjunction with the partial countercurrent depressurization of a main bed. In another embodiment, the main bed system may have ten beds. In this case, it is convenient to employ three pressure equalization steps with the main bed system, and to utilize a satellite bed system with three beds, with the gas released from each cocurrently, in conjunction with said partial countercurrent depressurization of the main beds, being used for compression of blowdown gas and for purging purposes.

Other variations and modifications of the invention can be made depending upon the overall requirements of the PSA operation. When product purity requirements are moderate, e.g., between about 99.0 and 99.9% purity being acceptable as compared with the higher purity levels obtainable in PSA processing, the cocurrent depressurization step can be continued with a breakthrough of the impurity adsorption front instead of starting a countercurrent depressurization step at the higher intermediate pressure level indicated above. The impure product gas thus obtained from the main beds is further purified in the satellite beds using processing cycles as above, with the only difference being that the partial countercurrent depressurization step then becomes cocurrent depressurization with impurity front breakthrough. While this variation could be used for the production of high purity product gas, e.g. up to 99.9% or higher, the removal of the impure product gas from the discharge end of bed and the product manifold, as a practical matter, requires considerably more purging and/or special steps than when such a variation is employed for the production of moderate purity product.

In general, however, this variation is quite efficient as the main beds are utilized more intensely, and the satellite beds receive only relatively low concentrations of impurities. It is also possible, in the practice of the invention, to depressurize the main beds simultaneously to both the inlet and to the discharge end thereof. In such embodiments, the gas obtained at the feed end of the main beds is passed to the feed end of the satellite beds as above. It should also be noted that the PSA systems of the invention can be readily designed so as to operate at reduced throughput in the main beds and reduced product recovery, as in conventional PSA processing, without the use of the satellite beds.

The invention provides a convenient and desirable process and system for reducing the FAS, significantly improving bed utilization, and enhancing product recovery in PSA operations. The invention is particularly advantageous for use in relatively high pressure applications and serves to facilitate the increasing use of pressure swing adsorption technology in practical, commercial gas separation operations.

Therefore, I claim:

1. In an adiabatic pressure swing adsorption process for selectively adsorbing at least one gas component from a feed gas mixture in a main multiple adsorption bed system in which each main bed undergoes the processing cycle of (a) introduction of feed gas to the bed inlet end at a superatmospheric adsorption pressure with discharge of unadsorbed effluent from the discharge end thereof; (b) partial cocurrent depressurization of said bed with release of void space gas from the discharge end of the bed; (c) introduction of the released void space gas to the discharge end of an adsorption bed(s), initially at lower pressure to equalize the pressure therebetween; (d) release of gas from the inlet end of the bed partially depressurized during said cocurrent depressurization step (b) above for countercurrent blowdown to its desorption pressure; (e) repressurization of the purged bed to the adsorption pressure; and (f) repetition of the cycle of steps (a)–(e) with additional quantities of feed gas, the improvement comprising terminating said cocurrent depressurization at an intermediate pressure such that the ratio of adsorption pressure/intermediate pressure is less than about 5/1, and (i) releasing void space gas from the inlet end of said main bed for partial countercurrent depressurization thereof prior to said countercurrent blowdown of step (d) above;

(ii) introducing the released void space gas of step (i) above to the inlet end of a satellite bed at about said intermediate pressure, said satellite bed being one of a satellite group of adsorption beds containing a lesser number and smaller beds than in said main bed system; and (iii) releasing gas from the discharge end of said satellite bed, whereby main bed utilization is enhanced, thus enabling reduced bed volume and less adsorbent to be employed, while product recovery is also enhanced.

2. The process of claim 1 in which said satellite bed provides gas for both pressure equalization and purging purposes.

3. The process of claim 2 in which said intermediate pressure is such that said pressure ratio is less than about 3/1.

4. The process of claim 3 in which the adsorption pressure is from about 20 to about 70 bar.

5. The process of claim 4 in which said unadsorbed effluent comprises hydrogen.

6. The process of claim 2 in which said main bed system has from about 4 to 10 adsorption beds.

7. The process of claim 6 in which said intermediate pressure is such that said pressure ratio is less than about 3/1, the adsorption pressure is from about 30 to about 70 bar, and said unadsorbed effluent comprises hydrogen.

8. The process of claim 3 in which the main adsorption bed system has seven beds and two pressure equalizations by cocurrent depressurization of a main bed, and said satellite bed system has two beds, with gas being released from each cocurrently, in conjunction with said partial countercurrent depressurization of the main bed, for said pressure equalization and purge purposes.

9. The process of claim 3 in which the main adsorption bed system has eight beds and two cocurrent depressurization-pressure equalization steps, and the satellite bed system has two beds.

10. The process of claim 3 in which the main adsorption bed system has nine beds and two cocurrent depressurization-pressure equalization steps, and said satellite bed system has three beds.

11. The process of claim 3 in which the main adsoprtion bed system has ten beds and two cocurrent depressurization-pressure equalization steps, and said satellite bed system has five beds, with gas released cocurrently therefrom being employed for two pressure equalizations and for purging.

12. The process of claim 1 in which said satellite bed provides purging gas.

13. The process of claim 12 in which said intermediate pressure is such that said pressure ratio is less than about 3/1.

14. The process of claim 13 in which the adsorption pressure is from about 20 to about 70 bar.

15. The process of claim 14 in which said unadsorbed effluent comprises hydrogen.

16. The process of claim 12 in which said main bed system has from about 4 to 10 adsorption beds.

17. The process of claim 16 in which said intermediate pressure is such that said pressure ratio is less than about 2/1, and the adsorption pressure is from about 20 to about 70 bar.

18. The process of claim 16 in which the main adsorption bed system has four beds and one pressure equalization by cocurrent depressurization, and said satellite bed system has two beds, with gas released from each cocurrently for purging in conjunction with said partial countercurrent depressurization of said main bed.

19. The process of claim 16 in which said main absorption bed system has from five to seven beds, and said satellite bed system has two beds.

20. The process of claim 16 in which said main adsorption bed system has eight or nine beds.

21. The process of claim 20 in which said main bed system employs three pressure equalization steps in its processing cycle, and said satellite bed system has three beds, with gas released from each cocurrently being used for compression of blowdown gas and for purging in conjunction with said partial countercurrent depressurization of said main bed.

22. The process of claim 16 in which said main adsorption bed system has ten beds.

23. The process of claim 22 in which said main system employs three pressure equalization steps, and said satellite bed system has four beds, with gas released from each cocurrently being used for compression of blowdown gas and for purging purposes.

24. The process of claim 1 and including:
(iv) introducing the gas released from said satellite bed to the discharge end of another main bed(s) and another satellite bed(s) to pressure equalize and/or purge said beds;
(v) releasing gas from the inlet end of said satellite bed for countercurrent blowdown to desorption pressure;
(vi) introducing gas from another satellite bed to the discharge end of said satellite bed at desorption pressure for the purging thereof, with purge gas discharge through the inlet thereof; and
(vii) repressurizing said satellite bed from its desorption pressure to said intermediate pressure.

25. An improved adiabatic pressure swing adsorption system having adsorbent beds for selectively adsorbing at least one gas component from a feed gas mixture comprising:
(a) a main multiple adsorption bed system of at least four main beds having means on a cyclic basis for (1) withdrawing product effluent from each bed at superatmospheric adsorption pressure, (2) releasing void space gas from the discharge end thereof for passage to another bed for pressure equalization therebetween, (3) releasing gas from the inlet end thereof for countercurrent blowdown to desorption pressure, (4) passing purge gas therethrough, and (5) repressurizing each said bed;
(b) a satellite group of adsorption beds containing a lesser number and smaller beds than in said main bed system, each satellite bed having means, on a cyclic basis, for (1) releasing gas from the discharge end of said bed for cocurrent depressurization from an intermediate pressure for pressure equalization and/or to provide purge to other satellite bed(s) and to a bed(s) in said main bed system, (2) releasing gas from the inlet end thereof for countercurrent blowdown to desorption pressure, and (3) purging and repressurizing said bed to said intermediate pressure; and
(c) conduit means for passing void space gas released by partial countercurrent depressurization, on a cyclic basis and upon completion of the release of gas from the discharge end of a main bed at an intermediate pressure such that the ratio of adsorption pressure/intermediate pressure is less than about 5/1, from the inlet end of each main bed to a satellite bed adapted for the simultaneous release of gas from the discharge end thereof to provide said pressure equalization and/or purge, said intermediate pressure of the main bed being also said intermediate pressure of the satellite bed, whereby cocurrent depressurization of the main bed can be terminated at a relatively high intermediate pressure level, said satellite bed system enabling the bed volume and adsorbent for the overall system, and the weight of steel needed for the main beds to be appreciably reduced, while enhancing the recovery of product from the overall system.

26. The adsorption system of claim 25 in which said satellite bed is adapted to release gas from its discharge end for both pressure equalization and/or for providing purge.

27. The adsorption system of claim 26 and including control means adapted to ensure completion of the release of gas from the discharge end of said main bed at an intermediate pressure such that said pressure ratio is in the range of from less than about 2/1 to less than about 3/1, and passage of void space gas from the inlet end thereof to a satellite bed at such intermediate pressure.

28. The adsorption system of claim 27 in which said main bed system has from about 6 to 10 adsorption beds.

29. The adsorption system of claim 28 in which said main adsorption bed system has seven beds, each adapted for two pressure equalizations by cocurrent depressurization, and said satellite bed system has two beds, with gas released from each cocurrently for pressure equalization and for purge in conjunction with said partial countercurrent depressurization of said main bed.

30. The adsorption system of claim 28 in which said main adsorption bed system has eight beds, each adapted for three cocurrent depressurization, pressure equalizations, and said satellite bed systems has three beds.

31. The adsorption system of claim 28 in which said main bed system has nine beds, each adapted for two cocurrent depressurization, pressure equalizations, and said satellite bed system has three beds.

32. The adsorption system of claim 28 in which said main bed system has ten beds, adapted for two cocurrent depressurization, pressure equalizations, and said satellite bed system has five beds.

33. The adsorption system of claim 25 in which said satellite bed is adapted to release gas from its discharge end for providing purge, but not for pressure equalization purposes.

34. The adsorption system of claim 33 and including control means adapted to ensure completion of the release of gas from the discharge end of said main bed at an intermediate pressure such that said pressure ratio is less than about 3/1, and passage of void space gas from the inlet end thereof to a satellite bed at such higher intermediate pressure.

35. The adsorption system of claim 34 in which said main bed system has from about 4 to 10 beds.

36. The adsorption system of claim 35 in which the main adsorption system has four beds, each adapted for one pressure equalization by cocurrent depressurization, and said satellite bed system has two beds, with gas released from each cocurrently for purge in conjunction with said partial countercurrent depressurization of said main bed.

37. The adsorption system of claim 35 in which said main adsorption bed system has from five to seven beds, and said satellite bed system has two beds.

38. The adsorption system of claim 35 in which said main adsorption bed system has eight or nine beds.

39. The adsorption system of claim 38 in which said main bed system is adapted for three cocurrent depressurization, pressure equalizations, and said satellite bed system has three beds, and including means for passing gas released from each cocurrently for compression of blowdown gas and for purging in conjunction with said partial countercurrent depressurization of said main bed.

40. The adsorption system of claim 35 in which said main adsorption bed system has ten beds.

41. The adsorption system of claim 40 in which said main bed system is adapted for three cocurrent depressurization, pressure equalizations, and said satellite bed system has four beds, and including means for passing gas released from each cocurrently for compression of blowdown gas and for purging in conjunction with said partial countercurrent depressurization of said main bed.

* * * * *